United States Patent
Hoctor

(10) Patent No.: US 6,480,139 B1
(45) Date of Patent: Nov. 12, 2002

(54) JAMMER COUNTING USING CHOLESKY FACTOR DIAGONAL ELEMENTS

(75) Inventor: Ralph Thomas Hoctor, Saratoga Springs, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 40 days.

(21) Appl. No.: 09/679,914

(22) Filed: Oct. 5, 2000

(51) Int. Cl.[7] .................................................. G01S 7/36
(52) U.S. Cl. ............................ 342/13; 342/16; 342/17; 342/159; 342/162; 342/194; 342/195
(58) Field of Search ............................... 342/13, 14, 15, 342/16, 17, 18, 19, 159, 162, 194, 195

(56) References Cited

U.S. PATENT DOCUMENTS

| | | | |
|---|---|---|---|
| 5,617,099 A | * | 4/1997 | Warren et al. ............... 342/159 |
| 5,798,942 A | * | 8/1998 | Danchick et al. ............. 342/96 |
| 6,091,361 A | * | 7/2000 | Davis et al. ................. 342/378 |
| 6,292,592 B1 | * | 9/2001 | Braunreiter et al. ........ 382/240 |

OTHER PUBLICATIONS

"Triangular factorization of inverse data covariance matrices", Baranoski, E.J., Acoustics, Speech, and Signal Processing, 1991 ICASSP–91., 1991, International Conference on, 1991, pp. 2245–2247 vol. 3.*

"Computation reduction in space time adaptive processing (STAP) of radar signals using orthogonal wavelet decompositions", Kadambe, S.; Owechko, Y., Signals, Systems and Computers, 2000. Conference Record of the Thirty–Fourth Asilomar Conference on, vol. 1.*

"Estimating the parameters of spectra in problems of remote radio sounding on near–Earth plasmas", Leus, S.G.; Pokhil'ko, S.N. Mathematical Methods in Electromagnetic Theory, 1998. MMET 98., 1998 International Conference on, pp.: 456 vol. 1.*

S.M. Yuen, "Algorithm and systolic architecture for solving Gram–Schmidt orthogonalization (GSO) systems," International Journal of Mini and Microcomputers, vol. 7, No. 2, (pp. 34–37) 1985.

W.H. Press, S.A. Teukolsky, W.T. Vetterling and B.P. Flannery, Numerical Recipes in C, $2^{nd}$ Edition (§2.9), Cambridge University Press, 1992.

W.M. Gentleman and H.T. Kung, "Matrix triangularization by systolic arrays," Proceedings of SPIE, vol. 298, Real Time Signal Processing IV, (pp. 298–303), 1981.

* cited by examiner

*Primary Examiner*—John B. Sotomayor
(74) *Attorney, Agent, or Firm*—Scully, Scott, Murphy & Presser

(57) ABSTRACT

A method and system for using the main diagonal elements of the Cholesky factor of the spatial covariance matrix to estimate the number of jammers present, by evaluating the AIC (or other) test function using the Cholesky diagonal elements in place of covariance eigenvalues. The Cholesky factor is often available as a by-product of adaptive beamforming.

20 Claims, 5 Drawing Sheets

Jammer Counting with 16-Element
Line Array, Min Jammer Spacing = 0.1

Jammer Counting with 16-Element Line Array, Min Jammer Spacing=0.1

Jammer Counting with 16-Element
Line Array, Min Jammer Spacing = 0.05

Jammer Counting with 16-Element Line Array, Min Jammer Spacing=0.05

JAMMER COUNTING USING CHOLESKY FACTOR DIAGONAL ELEMENTS

BACKGROUND OF THE INVENTION

This invention generally relates to radar electronic counter measure applications, and more specifically, to a method and system for counting the number of interfering signals, or jammers, in a received radar signal from an antenna array.

In radar ECCM applications, it is often of interest to count the number of jammers in the source distribution. This problem consists of estimating the number of self-luminous point sources using a passive array, and well-known methods exist for forming the estimate. These methods require knowledge (or an estimate) of the eigenvalues of the spatial covariance matrix. A test function is formed using these eigenvalues which attempts to locate a knee in the eigenvalue profile, the location of which gives an indication of the signal subspace dimension. One such test function which is widely used is the AIC test function.

Obtaining the eigenvalues of a sample covariance matrix requires a great deal of computation, both in the creation of the sample covariance matrix and in its eigendata decomposition. Since these operations are not typically performed in a radar, jammer counting can represent a considerable additional cost in the construction of the radar.

If adaptive beamforming is being performed in the radar system to counter the jamming threat, then it is possible that the ECCM processor has at its disposal an estimate of the Cholesky factor decomposition of the covariance matrix, which is used, for example, to solve for sidelobe canceller weights. The Cholesky factorization of the covariance matrix has the form $$R_x = LL^H$$

where the Cholesky factor L is lower triangular and the superscript "H" represents the operation of Hermetian transposition. Since this matrix is available, significant processing time can be saved if the number of jammers can be determined, or reliably estimated, using the Cholesky factor.

There are several well-known ways of producing or estimating a triangular factorization of the sample covariance matrix such as that given above. One of these, described in "Algorithm and systoloc architecture for solving Gram-Schmidt orthogonalization (GSO) systems," S. M. Yien, *Intl. Journal Mini and Microcomputers*, vol. 7 1985, is the so-called Gram-Schmidt (GS) processor. This processor estimates, from measurements of the wavefield received by the antenna array, the triangular matrix of weights required to transform the input data vector into a vector with uncorrelated components. Thus the GS processor produces a matrix U such that $$y = Ux,$$

where x is an antenna array observation and y is a vector, the covariance matrix of which is diagonal:

$$R_y = D = E\{yy^H\} = E\{Uxx^H U^H\} = UR_x U^H,$$

where D is a diagonal matrix which is also computed by the GS processor. From the above, it can be seen that the Cholesky factor is given by $$L = U^{-1} sqrt(D),$$

where sqrt(D) is a diagonal matrix whose main diagonal elements are the square roots of those on the main diagonal of D.

Another method of obtaining the Cholesky factor is to perform the Cholesky decomposition algorithm on the sample covariance matrix, which is first estimated from the array observations. This method is described in *Numerical Recipies in C*, 3d Ed., W. H. Press, S. A. Teukolsky, W. T. Vetterling and B. P. Flannery, Cambridge University Press, 1992. This method requires substantial computations.

Yet another well-known approach is that of operating directly on the matrix of array observations to estimate the factor L without first estimating a sample covariance matrix. This approach is described in "Matrix triangularization by systolic arrays," W. M. Gentleman and H. T. Kung, *Proc. SPIE*, vol. 298, Real Time Signal Processing IV, pp. 298–303, 1981. If the covariance matrix estimate is written $$R_x = X^H X,$$

where X is a rectangular array of measured data, and if the array X is factored into a Q-R form given by $$X = QL^H$$

where Q is an orthonormal matrix and L is lower triangular, then L is the required triangular factor. The Q-R factorization can be performed by either the Givens rotation or Householder reflection methods.

All of the methods discussed above can be implemented in software or in special-purpose hardware.

SUMMARY OF THE INVENTION

An object of this invention is to count the number of jammers in a radar signal in a manner that avoids the necessity of computing a separate eigen-decomposition of the sample covariance matrix to be used for jammer counting.

Another object of the present invention is to provide a computationally attractive technique that makes use of the structure of the Cholesky factor to count the number of jammers in a radar signal.

These and other objectives are attained with a method and system for estimating the number of interfering signals in a received signal from a radar antenna array. The method comprises the steps of estimating the Cholesky factor decomposition of the covariance matrix from the received signal, and using that estimate of the Cholesky factor to obtain a count of the number of interfering signals in the radar signal.

The Cholesky factor has diagonal elements and these elements are its eigenvalues; and, preferably, the using step includes the step of using those diagonal elements of the Cholesky factor to obtain the count of the number of interfering signals in the radar signal. Also, preferably, the Cholesky factor is estimated by estimating a triangular Cholesky factor of the covariance matrix directly from the received radar signal.

It is well known that the covariance eigenvalues are the squares of the singular values of L. The singular value decomposition (SVD) of a square matrix A can be written as $$A = V \Sigma U^H$$

where V and U are unitary (complex orthonormal) matrices (which have the property $VV^H = I$), and $\Sigma$ is a diagonal matrix whose non-zero elements are the square roots of the eigenvalues of the matrix $AA^H$. If we write the SVD of the N-by-N Cholesky factor L as $$L = V \Sigma U^H$$

then the covariance matrix can be written $$R=LL^H=V\Sigma U^H U\Sigma V^H=V\Sigma^2 V^H$$

which is an eigendata decomposition of $R_x$, since V is unitary and therefore biorthogonal.

Considering the above, the most reliable way of counting jammers, starting from the Cholesky factor, is to compute the singular value decomposition of L, using a standard method such as the Golub-Reinsch algorithm, and using the singular values in the AIC test function. The Golub-Reinsch algorithm is computationally intensive, requiring as many as $12N^3$ operations when applied to a square matrix of dimension N; however, it may be noted that parallel and systolic versions of the SVD exist in the literature.

The Cholesky factor singular value method has the advantage that it avoids computations of the sample covariance matrix and starts with the existing Cholesky factor estimate. However, the computation required to get the covariance eigenvalues is quite substantial, and it may be desirable to find a method of jammer counting based on the Cholesky factor estimate which requires less computation.

Although the singular values and eigenvalues of a square matrix are not identical (in general), they are related. In fact, signal and noise subspace dimensions which are clear in the singular values must also be present to some degree in the eigenvalues.

In view of this, the present invention preferably uses the eigenvalues of L in the AIC test function, in place of its singular values. This can be done without any further processing of the matrix, simply by using the diagonal entries of the Cholesky factor (which are its eigenvalues) in the AIC test function, and so it is computationally very attractive.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
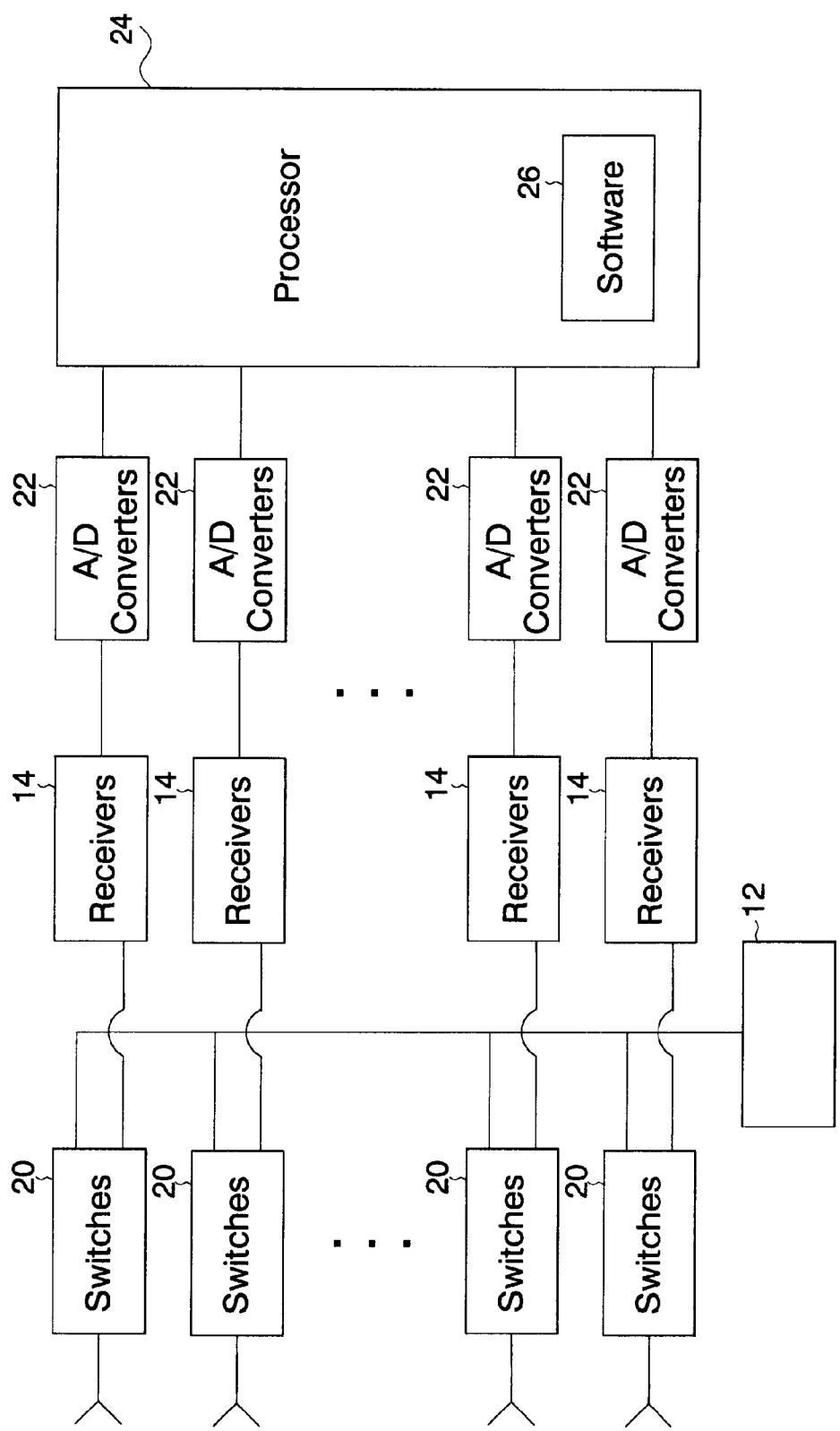
FIG. 1 illustrates a radar system that may be used in the practice of this invention.

FIG. 1 is a basic block diagram showing a radar system 10 comprising transmitter 12, an antenna array 16, consisting of a plurality of individual antennas, called array elements, a plurality of receivers 14, one for each array element, a plurality of transmit/receive select switches 20, one for each array element, a plurality of analog-to-digital converters 22, one for each receiver, and signal processing apparatus 24. In this system 10, transmitter 12, receivers 14, antenna array 16, switches 20 and A/D converters 22 may be conventional items used in a standard manner.

In particular, transmitter 12 is provided to generate a transmitting wave, and receivers 14 are used to receive and to process preliminarily a return wave measured at one of the antenna array elements. Antenna array 16 is used to receive the return wave and may also be used, in whole or in part, to transmit the generated transmitting wave. Switch 20 is used to switch a single antenna array element between receive and transmit modes. In the transmit mode, the wave generated by transmitter 12 is conducted, via switch 20, to the antenna for transmission thereby, and in the receive mode, the return wave detected by the antenna is conducted, also via switch 20, to receiver 14. A/D converter 22 is employed to convert the analog output from receiver 14 to a digital signal that is then applied to processing apparatus 24, and this signal processing apparatus is used to perform final processing of the return wave signal.

As mentioned above, in many radar system applications, the signal processing apparatus 24 obtains a triangular factorization of the sample covariance matrix of the array data. This triangular factorization is obtained for a number of reasons, primarily to suppress jamming, and thereby to help identify the direction and distance of targets. In accordance with the present invention, this Cholesky factor is used to determine or estimate the number of interfering signals in the received, return waves.

The present invention requires that means be provided for extracting the main diagonal elements of the estimated lower triangular Cholesky factor used in the signal processor to compute adaptive beamforming weights. These values are used in the AIC or other source counting function in place of the eigenvalues of the sample covariance matrix.

Figure 2:
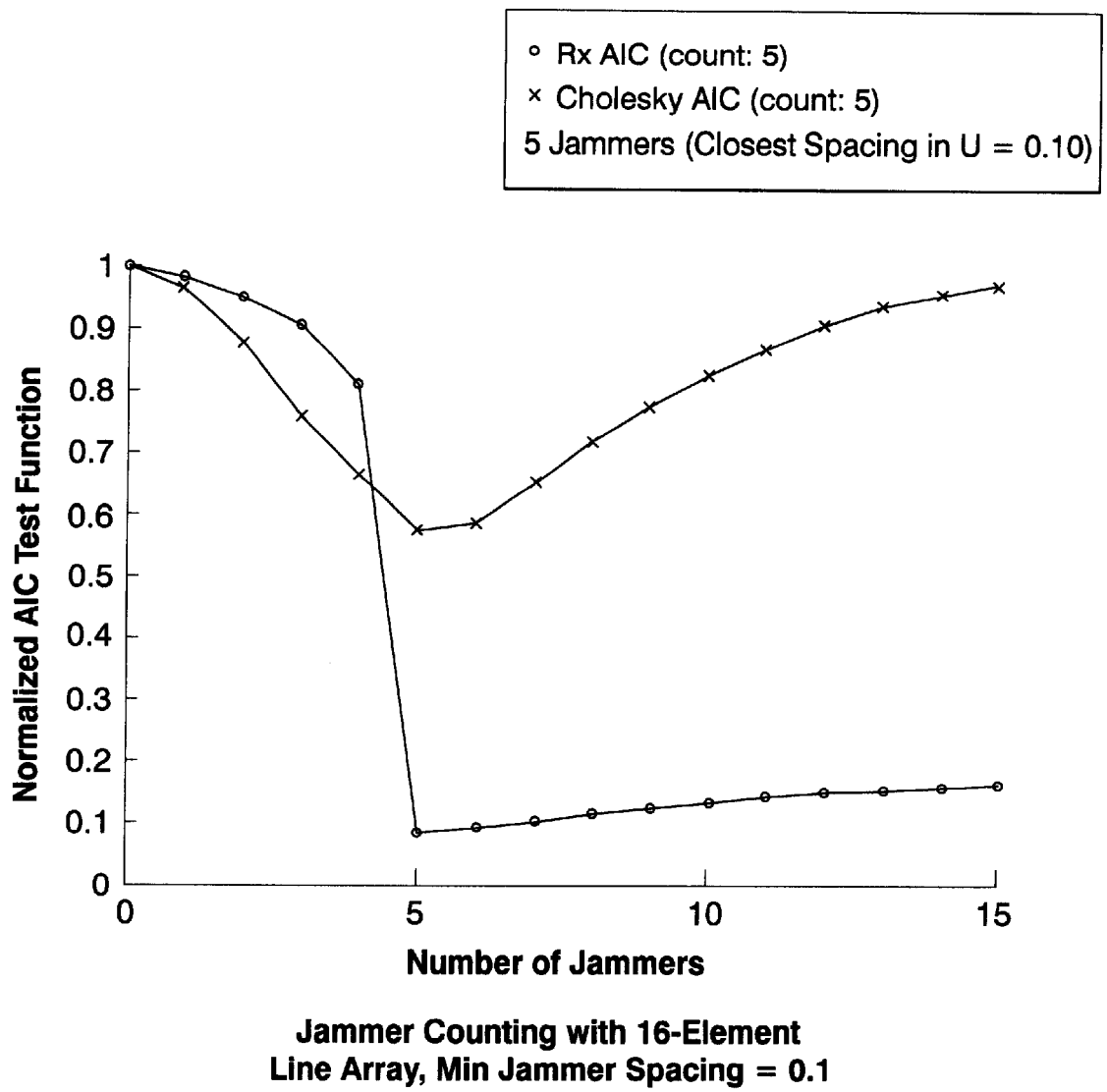
FIGS. 2 and 3 show the results of a simulation performed using this invention.
Figure 3:
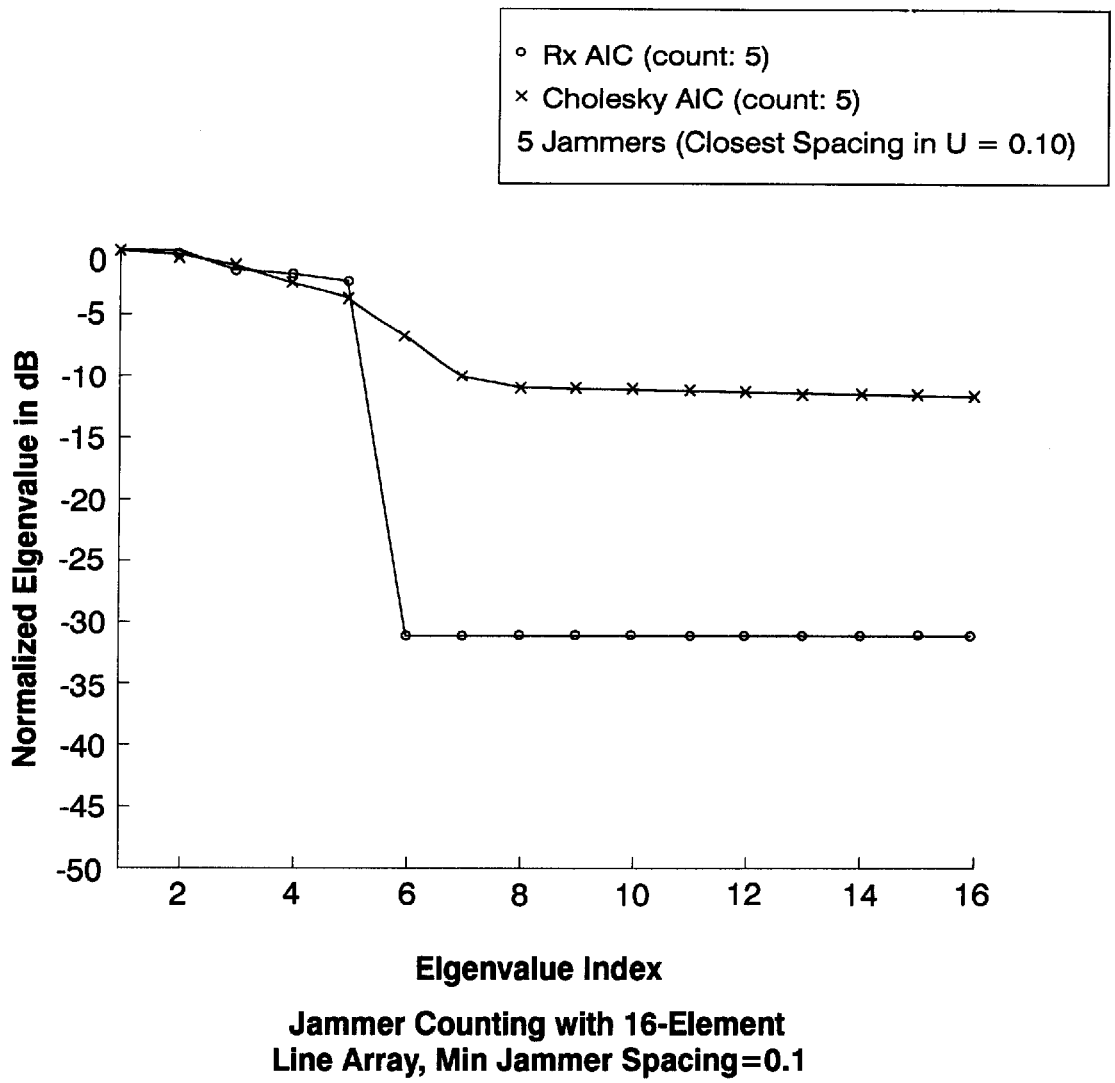

FIGS. 2 and 3 depict the results of a simulation performed with an 8λ line array and analytical narrow-band covariance matrices. Five equal-power jammers are simulated at 30 dB JNR, located in the reduced angular domain at u=0.6(−36.9 deg), u=0.3 (−17.5 deg), u=0.0 (broadside), u=0.4 (23.6 deg) and u=0.5 (30 deg). The 3 dB beamwidth is roughly 0.16 in the u domain. As can be seen from FIG. 1, the AIC function using the Cholesky eigenvalues has its minimum value at the same point as it does when evaluated using the covariance eigenvalues. That is, both methods estimate the correct number of jammers. However, the Cholesky eigenvalue profile in FIG. 2 shows a much less distinct knee than does the covariance eigenvalue profile. Even here, though, the signal subspace dimension can be reasonably estimated from the Cholesky eigenvalue profile.

Figure 4:
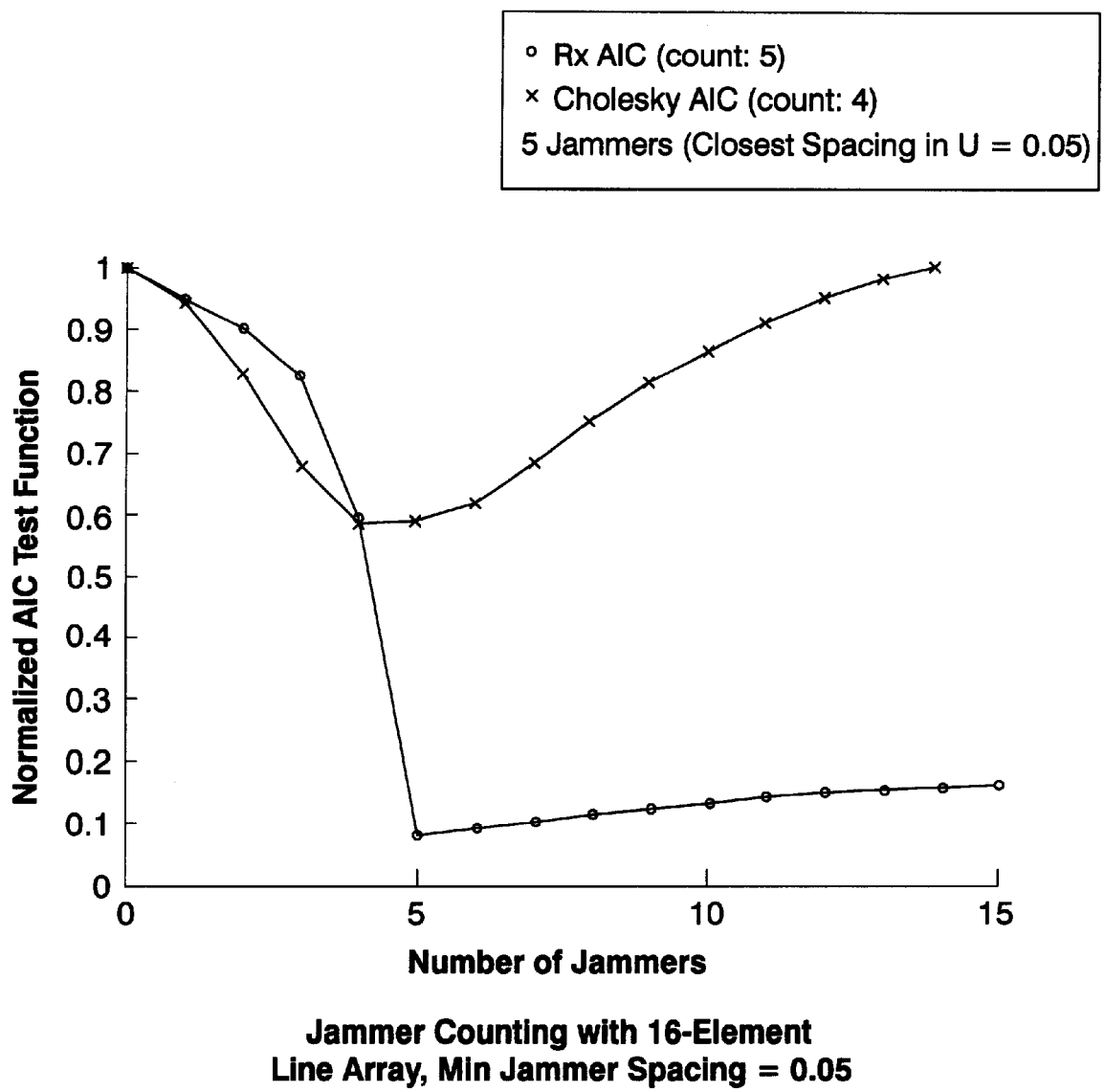
FIGS. 4 and 5 depict the results of a second simulation.
Figure 5:
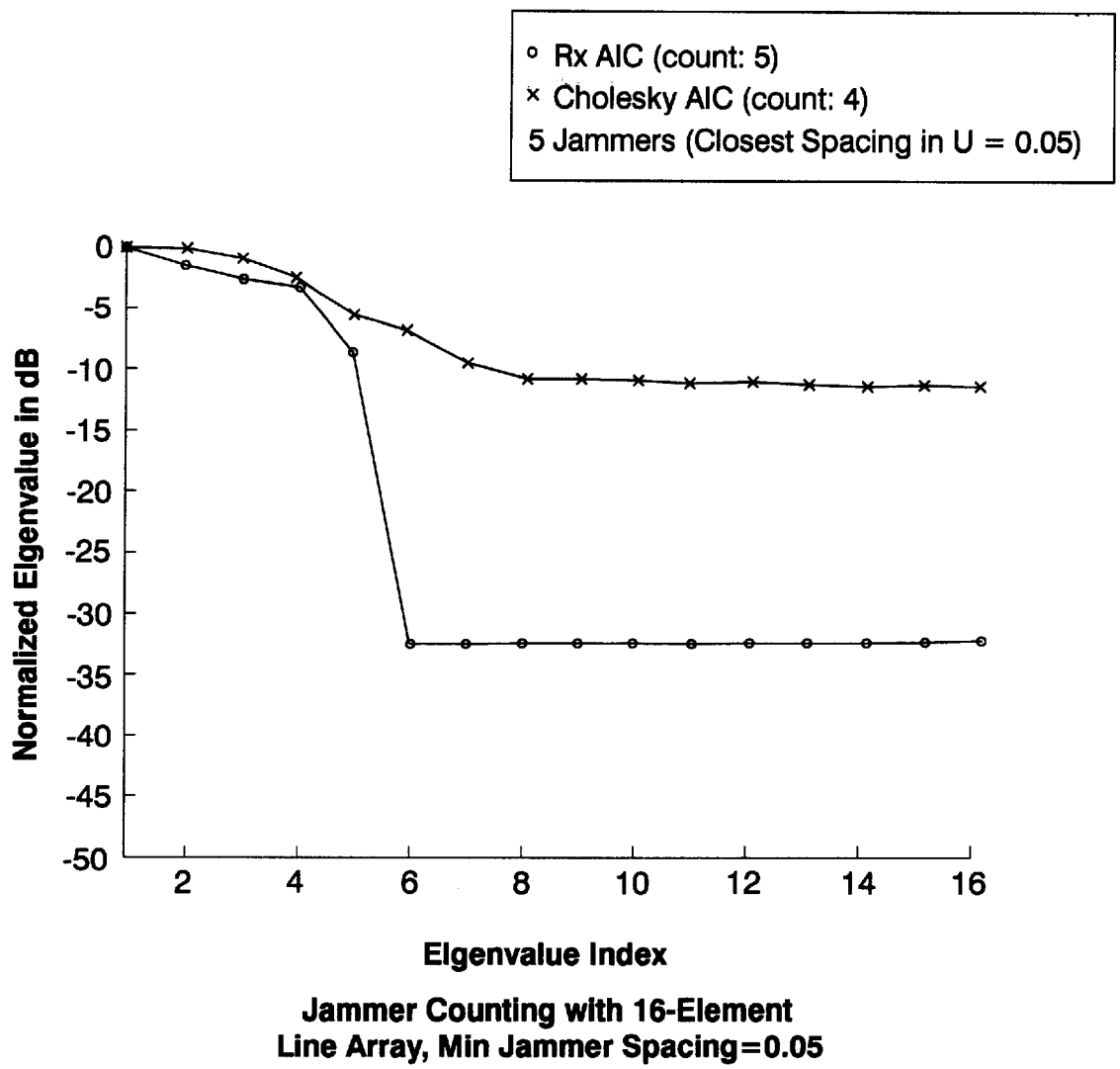

FIGS. 4 and 5 depict the results of a similar simulation to that of FIGS. 2 and 3, with a single change: the jammer at u=0.5 has been moved to u=0.45, which is separated by only Δu=0.05 from the nearest other jammer. This simulation shows that the AIC based on Cholesky eigenvalues did not resolve jammers spaced by one third of the 3 dB beamwidth. As a point of reference, standard AIC, based on the eigenvalues of the covariance matrix, will break down from jammer separations less than or equal to Δu=0.0008 for this length array.

The invention, as described above, allows the designer of an ECCM subsystem to trade off spatial (angular) resolution for computational complexity in a jammer counting processor, provided that a Cholesky factor estimate is available from some prior computation. This is often the case when the processor must also compute adaptive beamforming weights.

As will be understood by those of ordinary skill in the art, any suitable processor, computer or computer network may be used to perform the calculations necessary to carry out the present invention. For example, software for performing these calculations may be embedded in a processor, as schematically represented at 26 in FIG. 1. Alternately, dedicated hardware may be used to perform the calculations.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of estimating the number of interfering signals in a received signal from a radar antenna array, comprising the steps:

estimating the Cholesky factor decomposition of the covariance matrix from the received signal; and using said estimate of the Cholesky factor to obtain a count of the number of interfering signals in the radar signal.

2. A method according to claim 1, wherein the estimating step includes the steps of:

estimating a triangular Cholesky factor of the covariance matrix directly from the received radar signal; and using the triangular Cholesky factor as the Cholesky factor.

3. A method according to claim 1, wherein the Cholesky factor has diagonal elements, and the using step includes the step of using the diagonal elements of the Cholesky factor to obtain the count of the number of interfering signals in the radar signal.

4. A method according to claim 3, wherein the step of using the diagonal elements includes the step of using the diagonal elements in place of the covariance eigenvalues.

5. A method according to claim 1, wherein the estimating step includes the steps of:

estimating the covariance matrix directly from the received radar signal; and deriving the triangular Cholesky factor numerically from the estimated covariance matrix; and using the triangular Cholesky factor as the Cholesky factor.

6. A method according to claim 1, wherein the using step includes the steps of:

performing a singular value decomposition on the triangular Cholesky factor; and using the singular values so obtained to obtain the count of the number of interfering signals in the radar signal.

7. A method according to claim 1, wherein the using step includes the step of using an AIC test function to obtain a count of said number of interfering signals.

8. A method according to claim 7, wherein the step of using the AIC test function includes the steps of:

providing a profile of the estimated cholesky eigen values; and identifying a minimum in said profile.

9. A system for estimating the number of interfering signals in a received signal from a radar antenna array, comprising:

means for estimating the Cholesky factor decomposition of the covariance matrix from the received signal; and means for using said estimate of the Cholesky factor to obtain a count of the number of interfering signals in the radar signal.

10. A system according to claim 9, wherein:

the estimating means includes means for estimating a triangular Cholesky factor of the covariance matrix directly from the received radar signal; and the triangular Cholesky factor is used as the Cholesky factor.

11. A system according to claim 9, wherein the Cholesky factor has diagonal elements, and the means for using the estimate of the Cholesky factor includes means for using the diagonal elements of the Cholesky factor to obtain the count of the number of interfering signals in the radar signal.

12. A system according to claim 11, wherein the means for using the diagonal elements includes means for using the diagonal elements in place of the covariance eigenvalues.

13. A program storage device readable by machine, tangibly embodying a program of instructions executable by the machine to perform method steps for estimating the number of interfering signals in a received signal from a radar antenna array, said method steps comprising:

estimating the Cholesky factor decomposition of the covariance matrix from the received signal; and using said estimate of the Cholesky factor to obtain a count of the number of interfering signals in the radar signal.

14. A program storage device according to claim 13, wherein the estimating step includes the steps of:

estimating a triangular Cholesky factor of the covariance matrix directly from the received radar signal; and using the triangular Cholesky factor as the Cholesky factor.

15. A program storage device according to claim 13, wherein the Cholesky factor has diagonal elements, and the using step includes the step of using the diagonal elements of the Cholesky factor to obtain the count of the number of interfering signals in the radar signal.

16. A program storage device according to claim 15, wherein the step of using the diagonal elements includes the step of using the diagonal elements in place of the covariance eigenvalues.

17. A processor having software embedded in the processor for operating the processor to estimate the number of interfering signals in a received signal from a radar antenna signal, said software in the processor comprising:

means for estimating the Cholesky factor decomposition of the covariance matrix from the received signal; and means for using said estimate of the Cholesky factor to obtain a count of the number of interfering signals in the radar signal.

18. A processor according to claim 17, wherein:

the estimating means includes means for estimating a triangular Cholesky factor of the covariance matrix directly from the received radar signal; and the triangular Cholesky factor is used as the Cholesky factor.

19. A processor according to claim 17, wherein the Cholesky factor has diagonal elements, and the means for using the estimate of the Cholesky factor includes means for using the diagonal elements of the Cholesky factor to obtain the count of the number of interfering signals in the radar signal.

20. A processor according to claim 19, wherein the means for using the diagonal elements includes means for using the diagonal elements in place of the covariance eigenvalues.

* * * * *